(12) United States Patent
Mai

(10) Patent No.: US 11,805,341 B2
(45) Date of Patent: Oct. 31, 2023

(54) MOBILE TERMINAL

(71) Applicant: VIVO MOBILE COMMUNICATION CO., LTD., Guangdong (CN)

(72) Inventor: Biquan Mai, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 135 days.

(21) Appl. No.: 17/507,646

(22) Filed: Oct. 21, 2021

(65) Prior Publication Data

US 2022/0046345 A1 Feb. 10, 2022

Related U.S. Application Data

(63) Continuation of application No. PCT/CN2020/081845, filed on Mar. 27, 2020.

(30) Foreign Application Priority Data

Apr. 24, 2019 (CN) .......................... 201910335593.X

(51) Int. Cl.
*H04R 1/02* (2006.01)
*H04M 1/02* (2006.01)
*H04M 1/03* (2006.01)

(52) U.S. Cl.
CPC ............. *H04R 1/02* (2013.01); *H04M 1/0264* (2013.01); *H04M 1/035* (2013.01); *H04R 2499/11* (2013.01); *H04R 2499/15* (2013.01)

(58) Field of Classification Search
CPC .. H04R 1/02; H04R 2499/11; H04R 2499/15; H04R 1/021; H04R 1/345; H04M 1/0264;

(Continued)

(56) References Cited

U.S. PATENT DOCUMENTS 7,058,366 B2 * 6/2006 Patterson .............. H04M 1/035 381/313
10,747,050 B2 * 8/2020 Cheng ................. G09G 3/3406
(Continued)

FOREIGN PATENT DOCUMENTS

CN 101151875 A 3/2008
CN 201491201 A 5/2010
(Continued)

OTHER PUBLICATIONS

Chinese Office Action dated Jun. 2, 2020 as received in application No. 201910335593.X.
(Continued)

*Primary Examiner* — Oyesola C Ojo
(74) *Attorney, Agent, or Firm* — Maschoff Brennan

(57) ABSTRACT

Embodiments of this disclosure provide a mobile terminal, and relate to the field of communications technologies. The mobile terminal includes a screen, an earpiece, and a housing, where the screen is mounted on the housing, the earpiece is disposed in the housing, and the screen is provided with a sound output hole. The sound output hole corresponds to a first front cavity sound outlet and a second front cavity sound outlet that are independently arranged in the housing, the first front cavity sound outlet is connected to the earpiece through a first sound guide channel, and the second front cavity sound outlet is connected to the earpiece through a second sound guide channel A difference between a length of the first sound guide channel and that of the second sound guide channel is within a preset range.

9 Claims, 6 Drawing Sheets

(58) Field of Classification Search
CPC ........ H04M 1/035; H04M 1/026; H04M 1/03; H04M 1/0266
See application file for complete search history.

(56) References Cited

U.S. PATENT DOCUMENTS

| | | |
|---|---|---|
| 2002/0127974 A1 | 9/2002 | Song |
| 2004/0198239 A1 | 10/2004 | Patterson |
| 2009/0137268 A1* | 5/2009 | Fukazawa ............... H04R 1/345 455/566 |
| 2012/0055827 A1* | 3/2012 | Rashish ............... H04R 1/2842 206/320 |
| 2013/0114844 A1* | 5/2013 | Fukazawa ............... H04R 1/021 381/387 |
| 2013/0266170 A1 | 10/2013 | Yamagishi |
| 2014/0098982 A1* | 4/2014 | Chang ............... H04R 1/345 381/345 |
| 2021/0333841 A1* | 10/2021 | Li ............... G09F 9/335 |

FOREIGN PATENT DOCUMENTS

| | | | |
|---|---|---|---|
| CN | 103503474 A | 1/2014 | |
| CN | 108390972 A | 8/2018 | |
| CN | 207819992 A | 9/2018 | |
| CN | 207819992 U * | 9/2018 | ............ H04M 1/03 |
| CN | 108810678 A | 11/2018 | |
| CN | 108924715 A * | 11/2018 | ............ H04R 9/02 |
| CN | 108924715 A | 11/2018 | |
| CN | 110113453 A | 8/2019 | |
| WO | 2004054211 A1 | 6/2004 | |

OTHER PUBLICATIONS

International Search Report dated Jun. 17, 2020 as received in application No. PCT/CN2020/081845.
Extended European Search Report dated May 16, 2022 as received in Application No. 20794143.6.

* cited by examiner

MOBILE TERMINAL

CROSS REFERENCE TO RELATED APPLICATIONS

This application is a continuation application of PCT Application No. PCT/CN2020/081845 filed on Mar. 27, 2020, which claims priority to Chinese Patent Application 201910335593.X, filed on Apr. 24, 2019 in China, disclosures of which are incorporated herein by reference in their entireties.

TECHNICAL FIELD

The present disclosure belongs to the field of communications technologies, and in particular, to a mobile terminal.

BACKGROUND

Currently, full screens have become a trend, and a type of a common full screen is a bang screen. To further increase a screen-to-body ratio of a mobile terminal, the "bang" shape of a bang screen is reduced to a "water drop" shape, so as to form a water-drop screen.

In design of a mobile terminal with a water-drop screen, a front camera is located in the "water-drop" area of the screen, and a sound output hole of an earpiece is located at an edge of the screen. To achieve ultimate beauty of appearance, the front camera is located at the middle of the screen, and the sound output hole is also arranged symmetrically with respect to the center line of the screen. Therefore, the earpiece is designed eccentrically in an internal space of the mobile terminal below the screen. When a user uses the mobile terminal, postures of answering calls include holding the mobile terminal with the left hand to answer calls on the left ear side and holding the mobile terminal with the right hand to answer calls on the right ear side. In any posture, there will be a phenomenon that a partial area of the sound output hole is covered by an ear, and the earpiece can only emit sound through an uncovered area of the sound output hole.

However, because the earpiece is designed eccentrically, when the user answers a call in one of the postures, a distance between the uncovered area of the sound output hole and the earpiece becomes farther, resulting in poor sound quality of the call.

SUMMARY

An embodiment of the present disclosure provides a mobile terminal, including a screen, an earpiece, and a housing, where the screen is mounted on the housing, the earpiece is disposed in the housing, and the screen is provided with a sound output hole. The sound output hole corresponds to a first front cavity sound outlet and a second front cavity sound outlet that are independently arranged in the housing, the first front cavity sound outlet is connected to the earpiece through a first sound guide channel, and the second front cavity sound outlet is connected to the earpiece through a second sound guide channel. A difference between a length of the first sound guide channel and that of the second sound guide channel is within a preset range.

BRIEF DESCRIPTION OF DRAWINGS

The following describes features, advantages, and technical effects of the exemplary embodiments of the present disclosure with reference to the accompanying drawings.

DESCRIPTION OF EMBODIMENTS

The following further describes implementations of the present disclosure in detail with reference to the accompanying drawings and embodiments. The detailed description and drawings of the following embodiments are used to exemplarily illustrate the principles of the present disclosure, but cannot be used to limit the scope of the present disclosure, that is, the present disclosure is not limited to the described embodiments.

Figure 1:
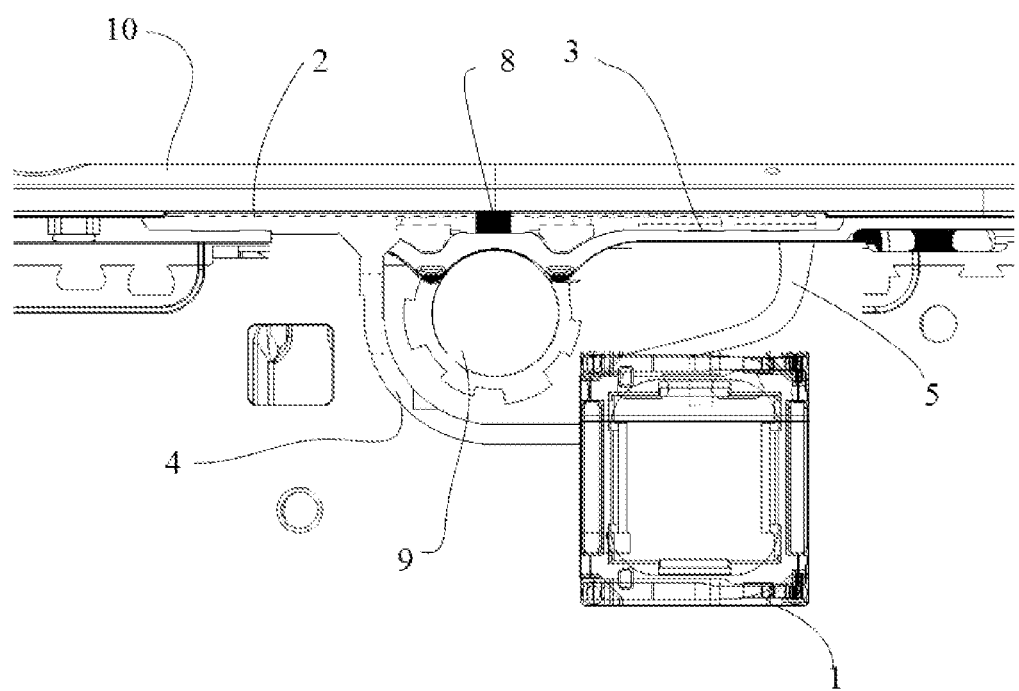
FIG. 1 is a partial structural diagram of a mobile terminal according to an embodiment of the present disclosure.

FIG. 1 is a partial structural diagram of a mobile terminal according to an embodiment of the present disclosure.

Referring to FIG. 1, an embodiment of the present disclosure provides a mobile terminal, including a screen, an earpiece 1, and a housing. The screen is mounted on the housing, the earpiece 1 is disposed in the housing, and the screen is provided with a sound output hole. The sound output hole corresponds to a first front cavity sound outlet 2 and a second front cavity sound outlet 3 that are independently arranged in the housing. The first front cavity sound outlet 2 is connected to the earpiece 1 through a first sound guide channel 4, and the second front cavity sound outlet 3 is connected to the earpiece 1 through a second sound guide channel 5. A difference between a length of the first sound guide channel 4 and that of the second sound guide channel 5 is within a preset range.

In this embodiment of the present disclosure, when a user answers a call, no matter whether a posture of answering the call is holding the mobile terminal with the left hand to answer the call on the left ear side or holding the mobile terminal with the right hand to answer the call on the right ear side, a partial area of the sound output hole is covered by an ear. If the first front cavity sound outlet 2 is covered, the sound emitted from the earpiece 1 can be played by the second front cavity sound outlet 3 through the second sound guide channel 5; if the second front cavity sound outlet 3 is covered, the sound emitted from the earpiece 1 can be played by the first front cavity sound outlet 2 through the first sound guide channel 4. It can be seen from the above process that the sound produced by the earpiece 1 can be propagated along two independent paths, and the difference between the length of the first sound guide channel 4 and that of the second sound guide channel 5 is within a preset range, so that separation distances between each of the sound outlets and the earpiece 1 are close. In addition, the sound guide channel plays a role in converging the sound, so that both paths have same sound quality, and the sound quality is relatively good. It can be learned that when the user answers the call in any of the postures, sound quality of the call is not decreased due to a longer separation distance between the uncovered area of the sound output hole and the earpiece 1. This resolves a problem of sound quality decrease such as volume decrease and distortion increase caused when the earpiece 1 is eccentrically designed.

In this embodiment of this disclosure, the difference between the length of the first sound guide channel 4 and that of the second sound guide channel 5 is within a preset range, so that lengths of the two sound guide channels designed are close, which ensures that sounds propagated through the two sound guide channels and then played by the first front cavity sound outlet 2 and the second front cavity sound outlet 3 are the same in volume, and further resolves a problem that different volumes of sounds output from the left side and the right side when a single sound outlet is covered in a case that the earpiece 1 is eccentrically designed.

Referring to FIG. 1, optionally, the length of the first sound guide channel 4 is equal to that of the second sound guide channel 5.

The length of the first sound guide channel 4 is equal to that of the second sound guide channel 5, which can ensure that sounds from the earpiece 1 are played synchronously after passing through the two paths, and play volumes are exactly the same, so that sound quality of a call can be guaranteed when the user answers the call in any posture.

Optionally, if a part of the first front cavity sound outlet 2 or a part of the second front cavity sound outlet 3 is covered, the sounds from the earpiece 1 may pass through the first sound guide channel 4 and the second sound guide channel 5 and be played simultaneously by the first front cavity sound outlet 2 and the second front cavity sound outlet 3, to implement sound superposition and enhance voice volume.

Optionally, in order to ensure that the lengths of the two sound guide channels are close or even equal, specific positions of the sound guide channels connected to the earpiece 1 are not limited. In addition, specific positions of the sound guide channels connected to the corresponding front cavity sound outlet are not limited, and an ultimate purpose is to ensure that the lengths of the two sound guide channels are close or even equal.

Optionally, a sound guide channel is connected with a sound cavity of the earpiece 1, so that a sound emitted from the earpiece 1 propagates to the sound guide channel through the sound cavity, and is then played by a corresponding front cavity sound outlet.

Figure 2:
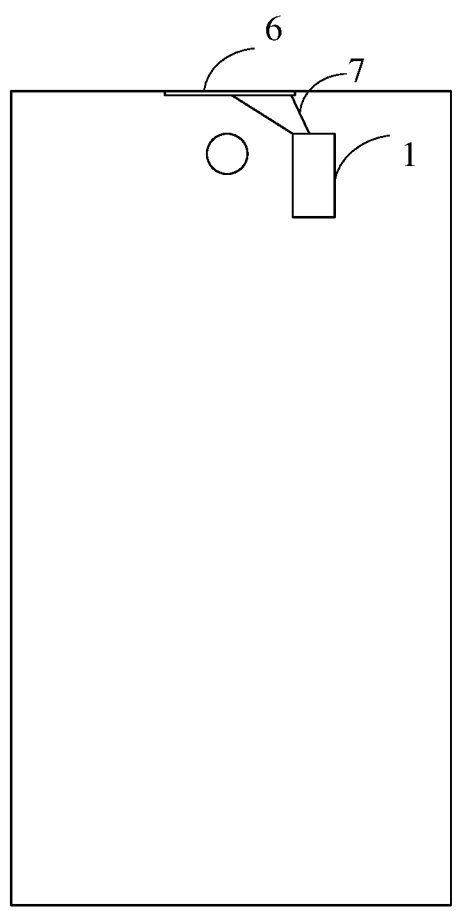
FIG. 2 is a schematic plan view 1 of a mobile terminal according to an embodiment of the present disclosure.
Figure 3:
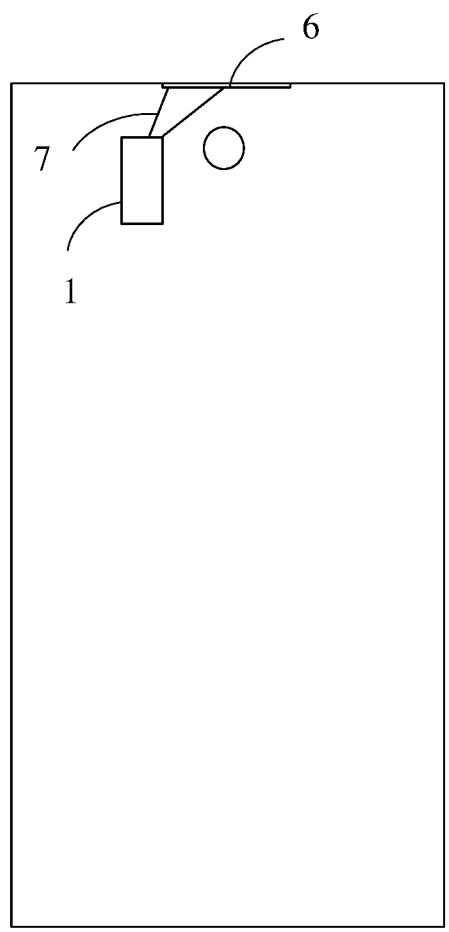
FIG. 3 is a schematic plan view 2 of a mobile terminal according to an embodiment of the present disclosure.

FIG. 2 is a schematic plan view 1 of a mobile terminal according to an embodiment of the present disclosure. FIG. 3 is a schematic plan view 2 of a mobile terminal according to an embodiment of the present disclosure.

Referring to FIG. 2 and FIG. 3, in a mobile terminal with an earpiece 1 eccentrically arranged, an entire sound outlet generally corresponds to an independent front cavity sound outlet in a housing, and the front cavity sound outlet is referred to as a third front cavity sound outlet 6. A third sound guide channel 7 can be connected between the third front cavity sound outlet 6 and the earpiece 1 based on the principle of proximity. However, this manner can only ensure play sound quality of a position of the third front cavity sound outlet 6 closer to the earpiece 1, and play sound quality of the entire third front cavity sound outlet 6 still cannot be guaranteed.

For example, referring to FIG. 2, in a mobile terminal with the earpiece 1 eccentrically arranged on the right, a sound output hole corresponds to the third front cavity sound outlet 6, and a third sound guide channel 7 can be connected between the right side of the third front cavity sound outlet 6 and the earpiece 1. When a user answers a call with the left ear by using the left hand, and the earlobe blocks the left side of the sound output hole, a sound emitted from the earpiece 1 is played with normal volume and quality from a right side of the third front cavity sound outlet 6 through the third sound guide channel 7. When the user answers a call with the right ear by using the right hand, and the earlobe blocks the right side of the sound output hole, a sound emitted from the earpiece 1 is played from a left side of the third front cavity sound outlet 6 through the third sound guide channel 7, which makes the sound channel longer, resulting in small sound and distortion.

The same is true for the mobile terminal with the earpiece 1 eccentrically arranged on the left shown in FIG. 3, which will not be repeated herein.

Therefore, in this embodiment, with reference to the user's operating habit, play effects at different positions of the front cavity sound outlet are respectively improved in terms of sound play quality.

In the mobile terminal with the earpiece 1 eccentrically arranged in FIG. 2 and FIG. 3, a single sound guide channel is disposed. It is obtained in a test that a distortion index of an audio objective test does not meet a standard. Double sound guide channels are provided in this embodiment of the present disclosure, a problem that the distortion index of the audio objective test does not meet a standard can be resolved.

Optionally, the solution in this embodiment of the present disclosure can also be applied to a mobile terminal in which the earpiece 1 is arranged centrally.

Optionally, a difference between a length of a first sound guide channel 4 and that of a second sound guide channel 5 is less than half of a minimum wavelength value of wideband speech.

The first sound guide channel 4 and the second sound guide channel 5 are designed to have an equal length as much as possible. In the design, a certain error is allowed, but the error needs to be within a preset range.

Due to size limitation of the mobile terminal, length values of the first sound guide channel 4 and the second sound guide channel 5 inside the housing are generally much less than a minimum wavelength value of wideband speech. Further, when the difference between the length of the first sound guide channel 4 and that of the second sound guide channel 5 is less than half of a minimum wavelength value of wideband speech, and when propagating simultaneously, two channels of sound have a same sound phase and in an area where they are superimposed and enhanced, an effect of increasing call volume is achieved, so that a phenomenon that waveforms of the two channels of sound weaken each other can be avoided.

Optionally, a length value of the first sound guide channel 4 and that of the second sound guide channel 5 are both less than a minimum wavelength value of wideband speech.

The length value of the first sound guide channel 4 and that of the second sound guide channel 5 are both less than 0.0425 m.

According to the formula: $\lambda = v/f$, where $\lambda$ denotes a wavelength, v denotes a speed of sound, and f denotes a frequency. The speed of sound is 340 m/s in the air. Currently, a maximum frequency of wideband speech is 8 Khz, and a minimum sound wavelength is 0.0425 m (340/8000). The first sound guide channel 4 and the second sound guide channel 5 are designed to have an equal length as much as possible, which is much smaller than 0.0425 m. When propagating simultaneously, two channels of sound have a same sound phase and in an area where they are superimposed and enhanced, the effect of increasing call volume is achieved.

Figure 4:
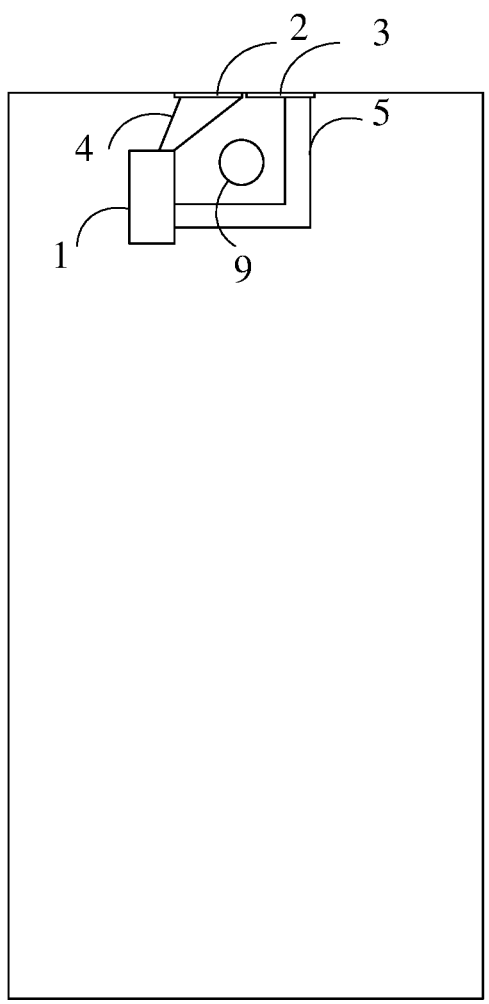
FIG. 4 is a schematic plan view 3 of a mobile terminal according to an embodiment of the present disclosure.

FIG. 4 is a schematic plan view 3 of a mobile terminal according to an embodiment of the present disclosure. FIG.

Figure 6:
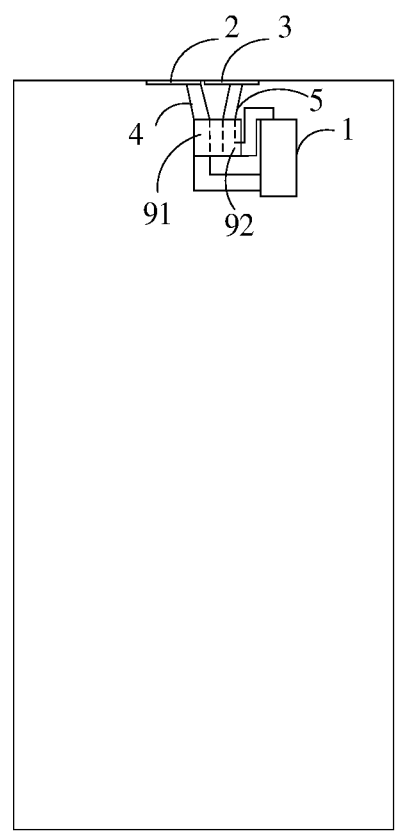
FIG. 6 is a schematic plan view 5 of a mobile terminal according to an embodiment of the present disclosure.

5 is a schematic plan view 4 of a mobile terminal according to an embodiment of the present disclosure. FIG. 6 is a schematic plan view 5 of a mobile terminal according to an embodiment of the present disclosure.

Figure 5:
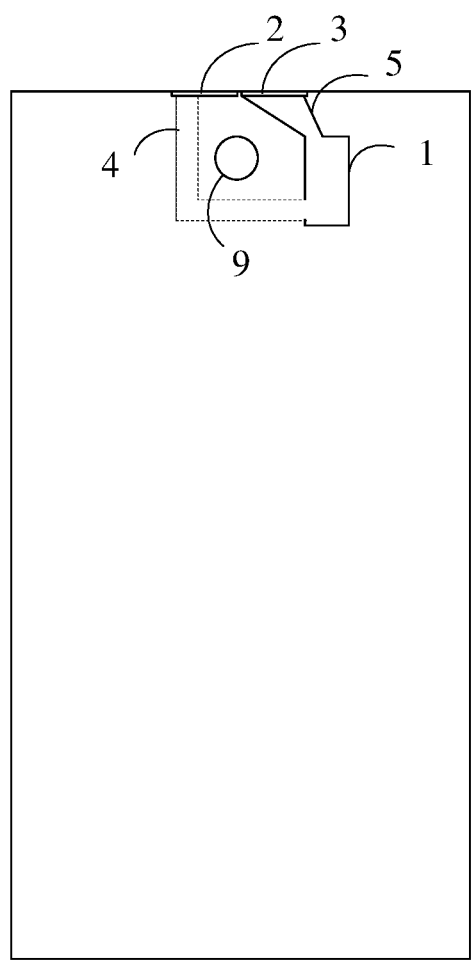
FIG. 5 is a schematic plan view 4 of a mobile terminal according to an embodiment of the present disclosure.

Referring to FIG. 1, FIG. 4, and FIG. 5, optionally, the first front cavity sound outlet 2 and the second front cavity sound outlet 3 are separated by an isolation mechanism 8 on the housing.

The sound output hole and a corresponding housing space below the sound output hole can be used as a front cavity sound outlet, so that the front cavity sound outlet can be divided by the isolation mechanism 8 into the first front cavity sound outlet 2 and the second front cavity sound outlet 3 that are independent of each other.

Optionally, the first front cavity sound outlet 2 and the second front cavity sound outlet 3 may be symmetrical with respect to the isolation mechanism 8, so that a space size of the first front cavity sound outlet 2 is equal to that of the second front cavity sound outlet 3, which further makes effects of sound transmitted through two channels exactly the same.

For example, for an earpiece 1 eccentrically arranged on the left or the right, the first front cavity sound outlet 2 and the second front cavity sound outlet 3 can be formed separately in the left and right directions.

Based on the foregoing design, a device composed of the first sound guide channel 4 and the first front cavity sound outlet 2 and a device composed of the second sound guide channel 5 and the second front cavity sound outlet 3 are independent of each other, so as to avoid deterioration of play sound quality due to interference between sounds.

Optionally, the isolation mechanism 8 is a part of a body structure of the housing; or the isolation mechanism 8 is a glue structure on the housing.

For example, two spaces can be dug out in the body structure of the housing to serve as the first front cavity sound outlet 2 and the second front cavity sound outlet 3, respectively, and a part of the body structure of the housing is retained between the two spaces to serve as the isolation mechanism 8.

For example, two spaces can be dug out in the glue structure on the housing to serve as the first front cavity sound outlet 2 and the second front cavity sound outlet 3, respectively, and a part of the glue structure is retained between the two spaces to serve as the isolation mechanism 8.

Based on the foregoing isolation mechanism 8, it is easier to form the first front cavity sound outlet 2 and the second front cavity sound outlet 3 that are independent of each other, and there is no need to add a new part. Processing difficulty is low, no production costs increase, and an internal structure of the mobile terminal is not affected either.

Optionally, the sound output hole is a long-strip-shaped hole, located at a top edge of the screen, and is parallel to the top edge of the screen; and the earpiece 1 is located on a first side or a second side of a central axis of the screen.

In a full screen, to pursue ultimate appearance, the earpiece 1 is gradually designed to output sound through a micro slit or a narrow slit. For example, in a common water-drop screen, a non-display area of the screen is used for arrangement of a camera. Generally, to ensure a shooting effect and appearance, the camera is disposed at the top of the screen in the middle, and sound is output through a narrow slit or a micro slit. In addition, a sound output hole is located at the center of the top edge of the screen, and the sound output hole is parallel to the top edge of the screen. From the perspective of appearance, sound is still output from the sound output hole in the center of the screen. However, the earpiece 1 is placed in a non-centered position of the screen and does not occupy a non-display area. Correspondingly, the earpiece 1 is located in a left area or a right area at the bottom of the screen.

In the related art, because the earpiece 1 deviates from the center axis of the screen, when a user answers a call on one side of directions, an ear blocks an area, close to the earpiece 1, of the sound output hole, and thus a subjective listening volume is much lower, and there are distortions, noises, vibrato, and the like; while when the user answers the call on the other side, because the earpiece 1 is close to the sound output hole, the volume and sound quality are normal.

Therefore, for the mobile terminal of this embodiment, the first sound guide channel 4 and the second sound guide channel 5 are designed, and the first front cavity sound outlet 2 and the second front cavity sound outlet 3 are separated, which effectively resolves problems of low sound, distortion and other poor sound quality caused when the earpiece 1 is eccentrically designed.

Optionally, the mobile terminal in this embodiment may be a single-sided screen or a double-sided screen.

Optionally, the earpiece 1 is located on a first side or a second side of a central axis of the screen. In different mobile terminals, the earpiece 1 may be located on the left or right side of the central axis of the screen, the earpiece 1 may be located on the upper or lower side of the central axis of the screen, or the earpiece 1 may be located on another azimuth side of a central axis of the screen.

Referring to FIG. 4 to FIG. 6, optionally, the mobile terminal further includes a camera module 9, the camera module 9 includes a camera and a bracket for fixing the camera. The bracket is provided with a first hollow part 91 and a second hollow part 92. The first hollow part 91 in the bracket is communicated to a plurality of lines in sequence in preset order to form the first sound guide channel 4; and the second hollow part 92 in the bracket is communicated to a plurality of lines in sequence in preset order to form the second sound guide channel 5.

For example, referring to FIG. 4, the camera module 9 is located on a central axis of the screen, and the earpiece 1 is located on the right side of the camera module 9. When a user answers a call with the left ear by using the left hand, and the earlobe blocks the first front cavity sound outlet 2, a sound emitted from the earpiece 1 is played from the second front cavity sound outlet 3 through the second sound guide channel 5. When a user answers a call with the right ear by using the right hand, and the earlobe blocks the second front cavity sound outlet 3, a sound emitted from the earpiece 1 is played from the first front cavity sound outlet 2 through the first sound guide channel 4. It can be learned that in the two cases, lengths of the sounding channels are close, so as to avoid volume decrease and distortion due to lengthening of the sounding channels.

For the disadvantages of the mobile terminal shown in FIG. 5, reference is made to the mobile terminal shown in FIG. 4, and details are not repeated.

Optionally, to avoid low play sound and occupation of an internal space of the mobile terminal by the sound guide channel, a length of the sound guide channel needs to be designed as short as possible.

Referring to FIG. 6, in this embodiment of the present disclosure, an internal material of the bracket is hollowed out as a part of the sound guide channel, so that an internal space of the mobile terminal occupied by the sound guide channel can be reduced.

The first hollow part 91 and the second hollow part 92 can be hollowed out at two different positions of the bracket, respectively. Specifically, positions, shapes, sizes, and other characteristics of the first hollow portion 91 and the second hollow portion 92 may be determined based on a structural characteristic of the bracket itself, an internal layout of the mobile terminal, a characteristic of the sound guide channel, and the like.

In the camera module 9 of an embodiment of the present disclosure, the bracket is arranged around a camera, a chip, and the like, so that the first hollow part 91 and the second hollow part 92 can be formed by hollowing out the bracket, which does not affect the camera, the chip, and the like. For a mobile terminal in which the earpiece 1 is eccentrically arranged on the left or the right, the first hollow part 91 and the second hollow part 92 may be formed on the left and right sides of the bracket, respectively. The first hollow part 91 formed on the left side of the bracket is communicated to a plurality of lines in a left area of the screen to form the first sound guide channel 4, and the first sound guide channel 4 is connected to a front cavity sound outlet on the left corresponding to the sound output hole. Corresponding, the second hollow part 92 formed on the right side of the bracket is communicated to a plurality of lines in a right area of the screen to form the second sound guide channel 5, and the second sound guide channel 5 is connected to a front cavity sound outlet on the right corresponding to the sound output hole.

Arrangement of the first hollow part 91 and the second hollow part 92 needs to ensure that normal use of the bracket is not affected, so as to guarantee an original function of the bracket, for example, a function of fixing the camera.

The first hollow part 91 is communicated to a plurality of lines in sequence in preset order to form the first sound guide channel 4; and the second hollow part 92 in the bracket is communicated to a plurality of lines in sequence in preset order to form the second sound guide channel 5. The preset order herein is not specifically limited. The front cavity sound outlet and the hollow part can be connected through a line, or the front cavity sound outlet and the hollow part can be connected directly; and the earpiece 1 and the hollow part can be connected through a line, or the earpiece 1 and the hollow part can be connected directly. Therefore, a quantity and shape of lines are not limited.

Optionally, the first hollow part 91 and the second hollow part 92 are respectively two through holes in the bracket, a shape of a cross section of the through hole is matched with that of a cross section of the line communicated to the through hole, and an area of the cross section of the through hole is equal to that of the cross section of the line communicated to the through hole.

In this embodiment of the present disclosure, a hollow part may be a through hole in the bracket, and the cross section of the through hole has a same area and shape as the cross section of a pipe communicated to the through hole, so that the hollow part and a plurality of lines form an independent sound guide channel.

The through hole has a relatively simple processing technology, and is easy to be communicated to a conventional line, so as to reduce processing costs and simplify the operation technology.

Optionally, a non-display area of the screen is in a water-drop shape.

The non-display area in the water-drop shape is used to arrange a camera, so as to maximize an area of a display area of the screen.

Optionally, referring to FIG. 1, the housing includes a middle frame 10 surrounding the screen.

It should be noted that in FIG. 4 to FIG. 6, the first sound guide channel 4 and the second sound guide channel 5 are only schematically shown, and a shape, a position, a length, and the like thereof are not limited.

In summary, in this embodiment of the present disclosure, two sound guide channels are added to guide sounds from inside of a mobile terminal to two independent front cavity sound outlets. The two front cavity sound outlets and the two sound guide channels form a stereo conductive structure for realizing sound superposition, so as to enhance voice volume and resolve problems such as low sound and distortion caused when an earpiece is eccentrically designed.

It should be noted that in this specification, the term "comprise", "include", or any other variant thereof is intended to cover a non-exclusive inclusion, so that a process, a method, an article, or an apparatus that includes a list of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

Although the present disclosure has been described with reference to the preferred embodiments, various modifications may be made to them and components therein can be replaced with equivalents without departing from the scope of the present disclosure. In particular, as long as there is no structural conflict, the various technical features mentioned in the embodiments can be combined in any manner. The present disclosure is not limited to the specific embodiments disclosed in the specification, but includes all technical solutions falling within the scope of the claims.

What is claimed is:

1. A mobile terminal, comprising a screen, an earpiece, and a housing, wherein the screen is mounted on the housing, the earpiece is disposed in the housing, and the screen is provided with a sound output hole; the sound output hole corresponds to a first front cavity sound outlet and a second front cavity sound outlet that are independently arranged in the housing, the first front cavity sound outlet is connected to the earpiece through a first sound guide channel, and the second front cavity sound outlet is connected to the earpiece through a second sound guide channel; and
   a difference between a length of the first sound guide channel and that of the second sound guide channel is within a preset range;
   wherein the mobile terminal further comprises a camera module, the camera module comprises a camera and a bracket for fixing the camera, and the bracket is provided with a first hollow part and a second hollow part;
   the first hollow part in the bracket is communicated to a plurality of lines in sequence in preset order to form the first sound guide channel; and
   the second hollow part in the bracket is communicated to a plurality of lines in sequence in preset order to form the second sound guide channel.

2. The mobile terminal according to claim 1, wherein the length of the first sound guide channel is equal to that of the second sound guide channel.

3. The mobile terminal according to claim 1, wherein a difference between the length of the first sound guide channel and that of the second sound guide channel is less than half of a minimum wavelength value of wideband speech.

4. The mobile terminal according to claim 1, wherein a length value of the first sound guide channel and that of the second sound guide channel are both less than a minimum wavelength value of wideband speech.

5. The mobile terminal according to claim 1, wherein the first front cavity sound outlet and the second front cavity sound outlet are separated by an isolation mechanism on the housing.

6. The mobile terminal according to claim 5, wherein the isolation mechanism is a part of a body structure of the housing; or the isolation mechanism is a glue structure on the housing.

7. The mobile terminal according to claim 1, wherein the sound output hole is a long-strip-shaped hole, located at a top edge of the screen, and is parallel to the top edge of the screen; and the earpiece is located on a first side or a second side of a central axis of the screen.

8. The mobile terminal according to claim 1, wherein the first hollow part and the second hollow part are respectively two through holes in the bracket, a shape of a cross section of the through hole is matched with that of a cross section of the line communicated to the through hole, and an area of the cross section of the through hole is equal to that of the cross section of the line communicated to the through hole.

9. The mobile terminal according to claim 1, wherein a non-display area of the screen is in a water-drop shape.

\* \* \* \* \*